US008803982B2

(12) United States Patent
Miyashita et al.

(10) Patent No.: US 8,803,982 B2
(45) Date of Patent: Aug. 12, 2014

(54) INFORMATION PROCESSING APPARATUS, INFORMATION PROCESSING METHOD, PROGRAM, AND INFORMATION PROCESSING SYSTEM FOR DETERMINING A SUBJECT AS BEING IMAGED BY A PLURALITY OF IMAGING DEVICES

(75) Inventors: Ken Miyashita, Tokyo (JP); Osamu Shigeta, Tokyo (JP); Akihiro Komori, Tokyo (JP); Nariaki Sato, Kanagawa (JP); Kazuyuki Yamamoto, Kanagawa (JP); Takuro Noda, Tokyo (JP)

(73) Assignee: Sony Corporation, Tokyo (JP)

( * ) Notice: Subject to any disclaimer, the term of this patent is extended or adjusted under 35 U.S.C. 154(b) by 26 days.

(21) Appl. No.: 13/474,252

(22) Filed: May 17, 2012

(65) Prior Publication Data

US 2012/0300086 A1 Nov. 29, 2012

(30) Foreign Application Priority Data

May 26, 2011 (JP) .................................. 2011-117610

(51) Int. Cl.
*H04N 5/228* (2006.01)
(52) U.S. Cl.
USPC .................... 348/208.11; 348/211.1

(58) Field of Classification Search
USPC .............................. 348/208.14, 211.1, 211.11
See application file for complete search history.

(56) References Cited

U.S. PATENT DOCUMENTS

| 2004/0239776 | A1* | 12/2004 | Shinohara et al. ............ 348/239 |
| 2007/0146484 | A1* | 6/2007 | Horton et al. ................. 348/159 |
| 2008/0278589 | A1* | 11/2008 | Thorn ....................... 348/208.14 |
| 2012/0163677 | A1* | 6/2012 | Thorn .......................... 382/115 |
| 2012/0169882 | A1* | 7/2012 | Millar et al. ............. 348/207.11 |

* cited by examiner

*Primary Examiner* — Gevell Selby
(74) *Attorney, Agent, or Firm* — Sherr & Jiang, PLLC

(57) ABSTRACT

There is provided an information processing apparatus including: an image pickup unit photographing a subject; a movement detecting unit detecting changes in movement of a subject photographed by the image pickup unit; a data generating unit generating first timing data relating to change timing at which the movement detecting unit detected a change in the movement; a receiving unit receiving second timing data, which relates to change timing when movement of a subject photographed by another apparatus was detected, from the other apparatus during photographing by the image pickup unit; and a determining unit determining, based on the first timing data generated by the data generating unit and the second timing data received by the receiving unit, whether the subject photographed by the image pickup unit and the subject photographed by the other apparatus are the same or a similar subject.

12 Claims, 11 Drawing Sheets

FIG.2
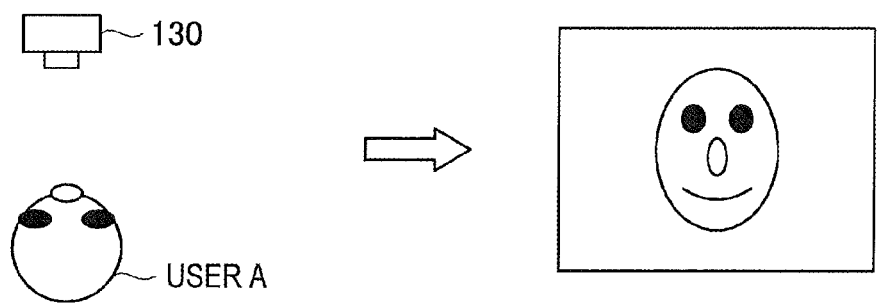
DURING IMAGE PICKUP BY USER TERMINAL
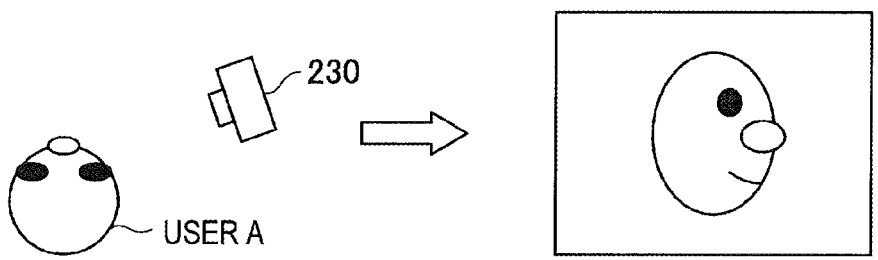
DURING IMAGE PICKUP BY TV APPARATUS

FIG.4

```
<?xml version="1.0" encoding="utf-8"?>
<timesequence xmlns:ts=http://schemas.sample.com/ts>
    <timestamp ts:time="1234341"/>
    <timestamp ts:time="1234430"/>
    <timestamp ts:time="1234510"/>
    <timestamp ts:time="1234600"/>
    <timestamp ts:time="1234700"/>
</timesequence>
```

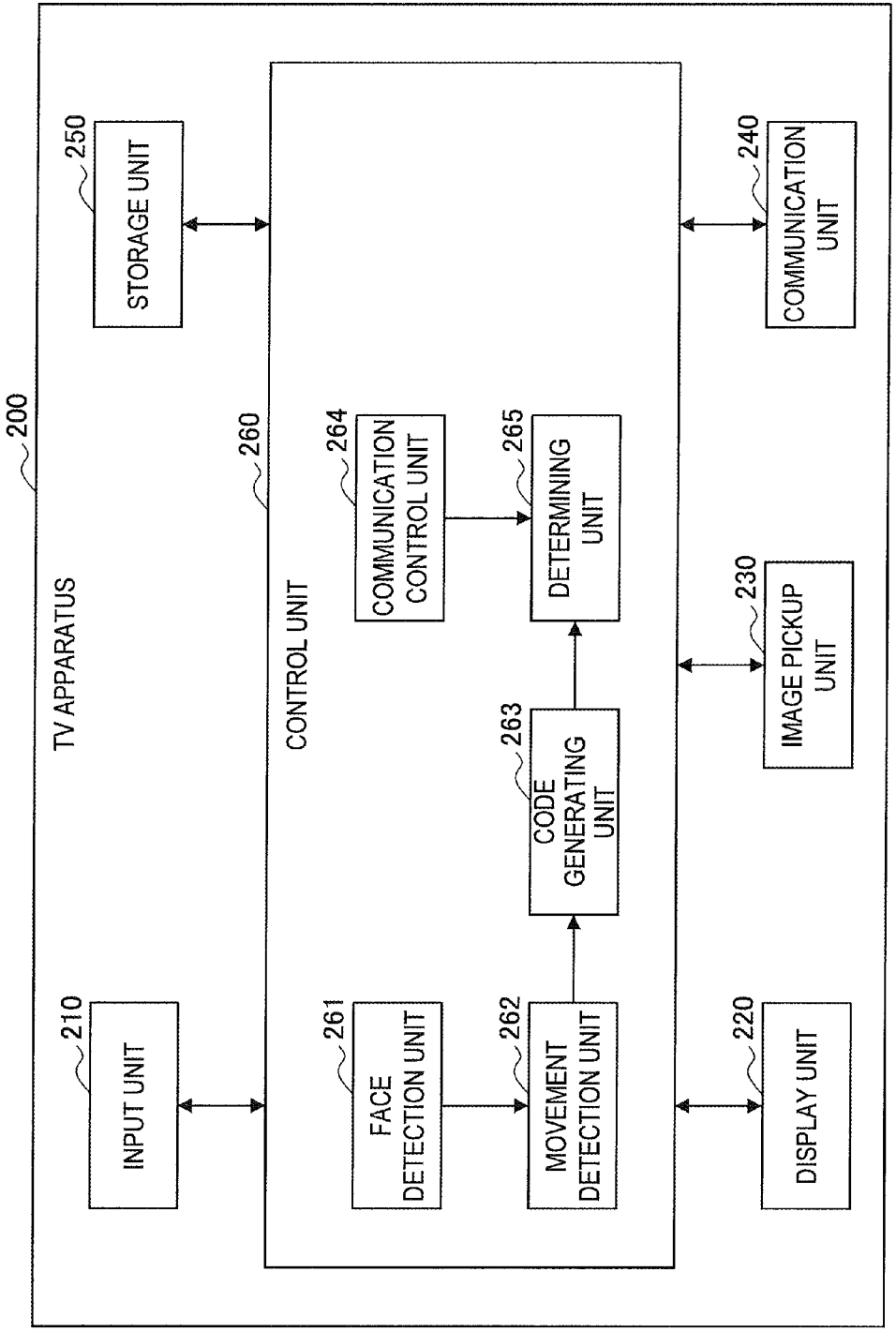

$T_{min}$ = max(min(t1...tm), min(u1...un));

$T_{max}$ = min(max(t1...tm), max(u1...un));

$i_{min}$ = minimum index of t while t >= $T_{min}$;

$i_{max}$ = maximum index of t while t <= $T_{max}$;

num = 0;

for(i = $i_{min}$; I <= $i_{max}$; i++){ u = findNearestU(ti);

err = |u - ti|;

if(err < ERRmax) num = num + 1;

} score = num / ($i_{max}$ - $i_{min}$ + 1);

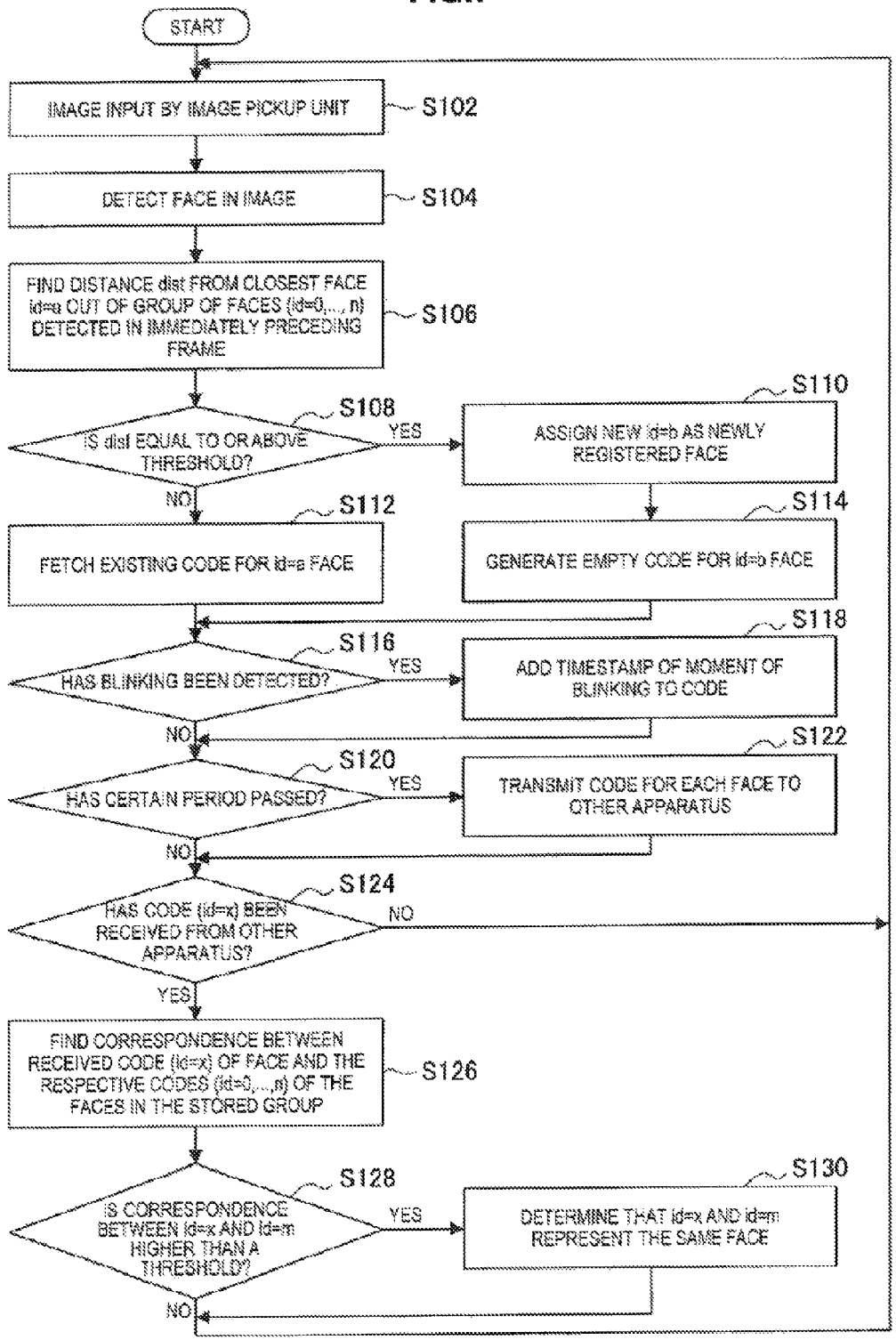

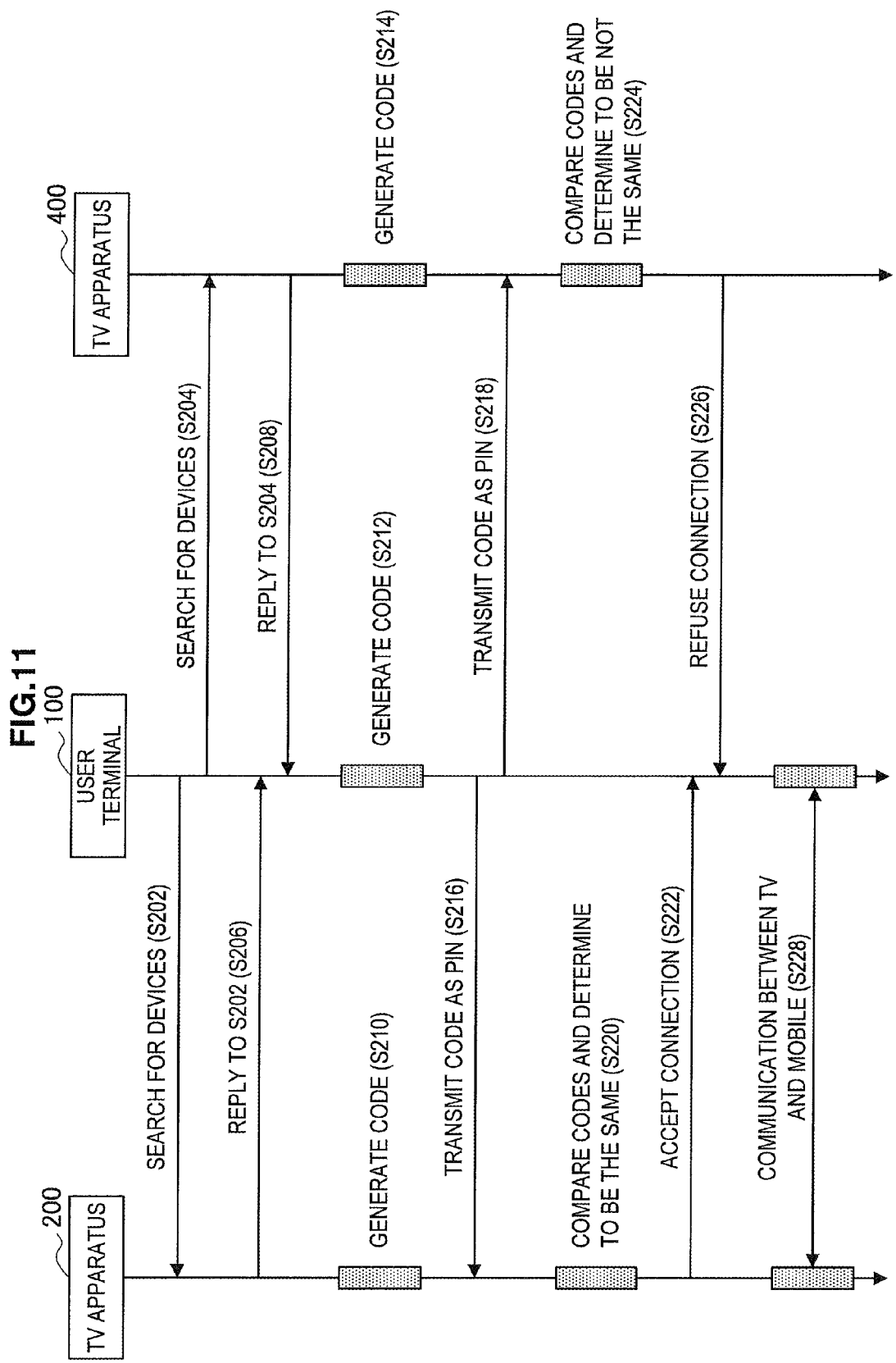

INFORMATION PROCESSING APPARATUS, INFORMATION PROCESSING METHOD, PROGRAM, AND INFORMATION PROCESSING SYSTEM FOR DETERMINING A SUBJECT AS BEING IMAGED BY A PLURALITY OF IMAGING DEVICES

BACKGROUND

The present disclosure relates to an information processing apparatus, an information processing method, a program, and an information processing system.

Due to the spread of the Internet and advances in hardware technology in recent years, an ever-increasing number of users now use information processing apparatuses such as personal computers, mobile telephones, and TV apparatuses. Also, the increasing miniaturization of cameras that can pick up images of subjects has led to cameras being installed in information processing apparatuses. For information processing apparatuses equipped with cameras, a subject recognition technique that can recognize the subject in an image has been proposed (see Japanese Laid-Open Patent Publication No. 2010-61465).

SUMMARY

However, in some cases a plurality of information processing apparatuses equipped with image pickup units such as cameras will photograph a subject at the same time. In such a situation, it can be desirable to detect the same subject in the images picked up by the respective information processing apparatuses. However, if the plurality of information processing apparatuses photograph a subject from different viewpoints, since the orientation of the subject's face will differ in the images that are picked up, it will be difficult to extract the same subject.

For this reason, the present disclosure proposes a method capable of easily extracting the same or a similar subject when subjects are photographed by a plurality of apparatuses with different viewpoints.

According to an embodiment of the present disclosure, there is provided an information processing apparatus including an image pickup unit photographing a subject, a movement detecting unit detecting changes in movement of the subject photographed by the image pickup unit, a data generating unit generating first timing data relating to change timing at which the movement detecting unit detected the changes in the movement, a receiving unit receiving second timing data, which relates to change timing when movement of a subject photographed by another apparatus was detected, from the other apparatus during photographing by the image pickup unit, and a determining unit determining, based on the first timing data generated by the data generating unit and the second timing data received by the receiving unit, whether the subject photographed by the image pickup unit and the subject photographed by the other apparatus are the same or a similar subject.

According to an embodiment of the present disclosure, there is provided an information processing method including detecting a change in movement of a subject photographed by an image pickup unit of an apparatus, generating first timing data relating to change timing at which the change in movement was detected, receiving second timing data, which relates to change timing when movement of a subject photographed by another apparatus was detected, from the other apparatus during photographing by the image pickup unit, and determining, based on the generated first timing data and the received second timing data, whether the subject photographed by the image pickup unit and the subject photographed by the other apparatus are the same or a similar subject.

According to an embodiment of the present disclosure, there is provided a program causing a computer to detect a change in movement of a subject photographed by an image pickup unit of an apparatus, to generate first timing data relating to change timing at which the change in movement was detected, to receive second timing data, which relates to change timing when movement of a subject photographed by another apparatus was detected, from the other apparatus during photographing by the image pickup unit, and to determine, based on the generated first timing data and the received second timing data, whether the subject photographed by the image pickup unit and the subject photographed by the other apparatus are the same or a similar subject.

According to an embodiment of the present disclosure, there is provided an information processing system including an information processing apparatus including a first image pickup unit photographing a subject, a first movement detecting unit detecting changes in movement of a subject photographed by the first image pickup unit, and a first data generating unit generating first timing data relating to change timing at which the first movement detecting unit detected a change in the movement, and a communication apparatus including a second image pickup unit photographing a subject, a second movement detecting unit detecting changes in movement of a subject photographed by the second image pickup unit, a second data generating unit generating second timing data relating to change timing at which the second movement detecting unit detected a change in the movement, and a transmission unit transmitting the second timing data generated by the second data generating unit to the information processing apparatus. The information processing apparatus may further include a receiving unit receiving the second timing data via the transmission unit from the communication apparatus during photographing by the first image pickup unit, and a determining unit determining, based on the first timing data and the second timing data, whether the subject photographed by the first image pickup unit and the subject photographed by the second image pickup unit are the same or a similar subject.

According to the embodiments of the present disclosure described above, it is possible to easily extract the same or a similar subject when subjects are photographed by a plurality of apparatuses with different viewpoints.

BRIEF DESCRIPTION OF THE DRAWINGS

FIG. 2 is a schematic diagram useful in explaining how the orientation of the user's face differs between images picked up by a user terminal and a TV apparatus;

FIG. 4 shows an example of code as timing data generated by a code generating unit;

FIG. 5 is a diagram showing the detailed configuration of the TV apparatus according to the first embodiment;

FIG. 7 is a flowchart showing an example operation of an information processing system;

FIG. 11 is a sequence chart useful in explaining the operation of an information processing system when carrying out a pairing process.

DETAILED DESCRIPTION OF THE EMBODIMENT(S)

Figure 1:
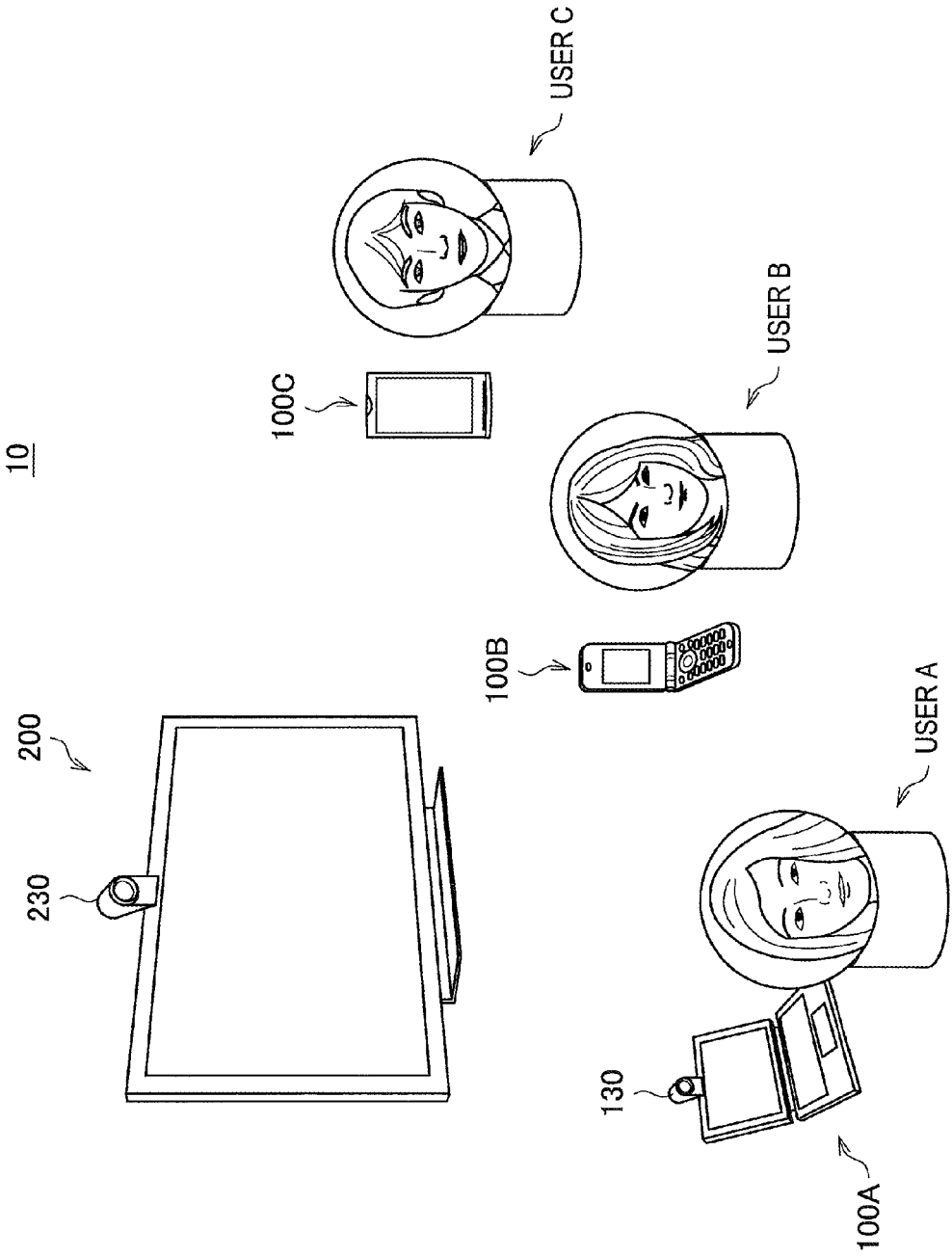
FIG. 1 is a diagram showing the configuration of an information processing system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The embodiments of the present disclosure are described in the order indicated below.

1. First Embodiment
    1-1. Configuration of Information Processing System
    1-2. Detailed Configuration of User Terminal
    1-3. Detailed Configuration of TV Apparatus
    1-4. Operation of Information Processing System
2. Second Embodiment
3. Third Embodiment
1. First Embodiment
    1-1. Configuration of Information Processing System The configuration of an information processing system 10 according to a first embodiment of the present disclosure will now be described with reference to FIG. 1. FIG. 1 is a diagram showing the configuration of the information processing system 10 according to the first embodiment.

As shown in FIG. 1, the information processing system 10 includes user terminals 100A, 100B, and 100C as examples of "communication apparatuses" for the present disclosure and a TV apparatus 200 that is one example of an "information processing apparatus". The user terminals 100A, 100B, and 100C and the TV apparatus 200 are capable of communication via a wireless network or the like. Note that although three user terminals are shown in FIG. 1, the number of user terminals is not limited to three.

The user terminals 100A, 100B, and 100C are terminals such as mobile telephones, PDAs, or personal computers that are used by users. The user terminals 100A, 100B, and 100C (hereinafter collectively referred to as the "user terminals 100" for ease of explanation) each include an image pickup unit 130 such as a camera and pick up images of the user of such terminal as the subject. That is, the user of each user terminal 100 can take self shots using his/her user terminal 100. For example, the user terminal 100A picks up images of the user A who is using the user terminal 100A, the user terminal 100B picks up images of the user B who is using the user terminal 100B, and the user terminal 100C picks up images of the user C who is using the user terminal 100C. Hereinafter, in this specification the picking up of images is referred to as "photographing". Each user terminal 100 has a face detection function for detecting the face of the user being photographed. Unlike FIG. 1, the faces of the users A, B, and C actually face the user terminals 100A, 100B, and 100C. Note that the detailed configuration of the user terminals 100 will be described later.

The TV apparatus 200 is an apparatus that displays images such as video. In the same way as the user terminals 100, the TV apparatus 200 includes an image pickup unit 230 and photographs, as subjects, the users A, B, and C (hereinafter simply "users") who use the user terminals 100A, 100B, and 100C. The TV apparatus 200 also has a face detection function for detecting the faces of the users being photographed. Note that the detailed configuration of the TV apparatus 200 will be described later.

However, with the information processing system 10 according to the present embodiment, there are cases where a user terminal 100 and the TV apparatus 200 photograph a user at the same timing. As one example, the user terminal 100A and the TV apparatus 200 photograph the user A at the same timing. At such time, since the user terminal 100A and the TV apparatus 200 have different viewpoints for the user A, the orientation of the face of the user A differs in the picked up images.

FIG. 2 is a schematic diagram useful in describing the difference in facial orientation of the user between the images picked up by the user terminal 100A and the TV apparatus 200. As shown in FIG. 2, since the image pickup unit 130 of the user terminal 100A is positioned so as to face the user A, the images (still images) picked up by the image pickup unit 130 include the user A who is facing straight ahead. Meanwhile, since the image pickup unit 230 of the TV apparatus 200 is positioned at an angle to the user A, the images picked up by the image pickup unit 230 include the user A who is facing at an angle.

To easily detect the same or a similar user even when the user terminal 100 and the TV apparatus 200 photograph a user from different viewpoints as described above, the user terminal 100 and the TV apparatus 200 carry out the cooperative processing described below.

That is, although described in detail later, the TV apparatus 200 first detects a change in the movement of the user (for example, blinking of the user's eyes) photographed by the image pickup unit 230 and generates timing data (hereinafter referred to as "first timing data") relating to the change timing at which the change in the movement of the user was detected. In the same way, the user terminal 100 also detects a change in the movement of the user (for example, blinking of the user's eyes) photographed by the image pickup unit 130 and generates timing data (hereinafter referred to as "second timing data") relating to the change timing at which the change in the movement of the user was detected.

Next, during image pickup by the image pickup unit 230, the TV apparatus 200 receives the second timing data generated by the user terminal 100 from the user terminal 100. The TV apparatus 200 then determines, based on the first timing data and the second timing data, whether the user photographed by the image pickup unit 230 and the user photographed by the image pickup unit 130 are the same or a similar user.

With the above configuration, when a user is photographed by a plurality of apparatuses with different viewpoints, it is possible to determine, even if the user's face is oriented in different directions, whether the same user is being photographed based on the timing of facial movements. For this reason, when users are photographed by a plurality of apparatuses with different viewpoints, it is possible to easily extract the same or similar users.

1-2. Detailed Configuration of User Terminal

Figure 3:
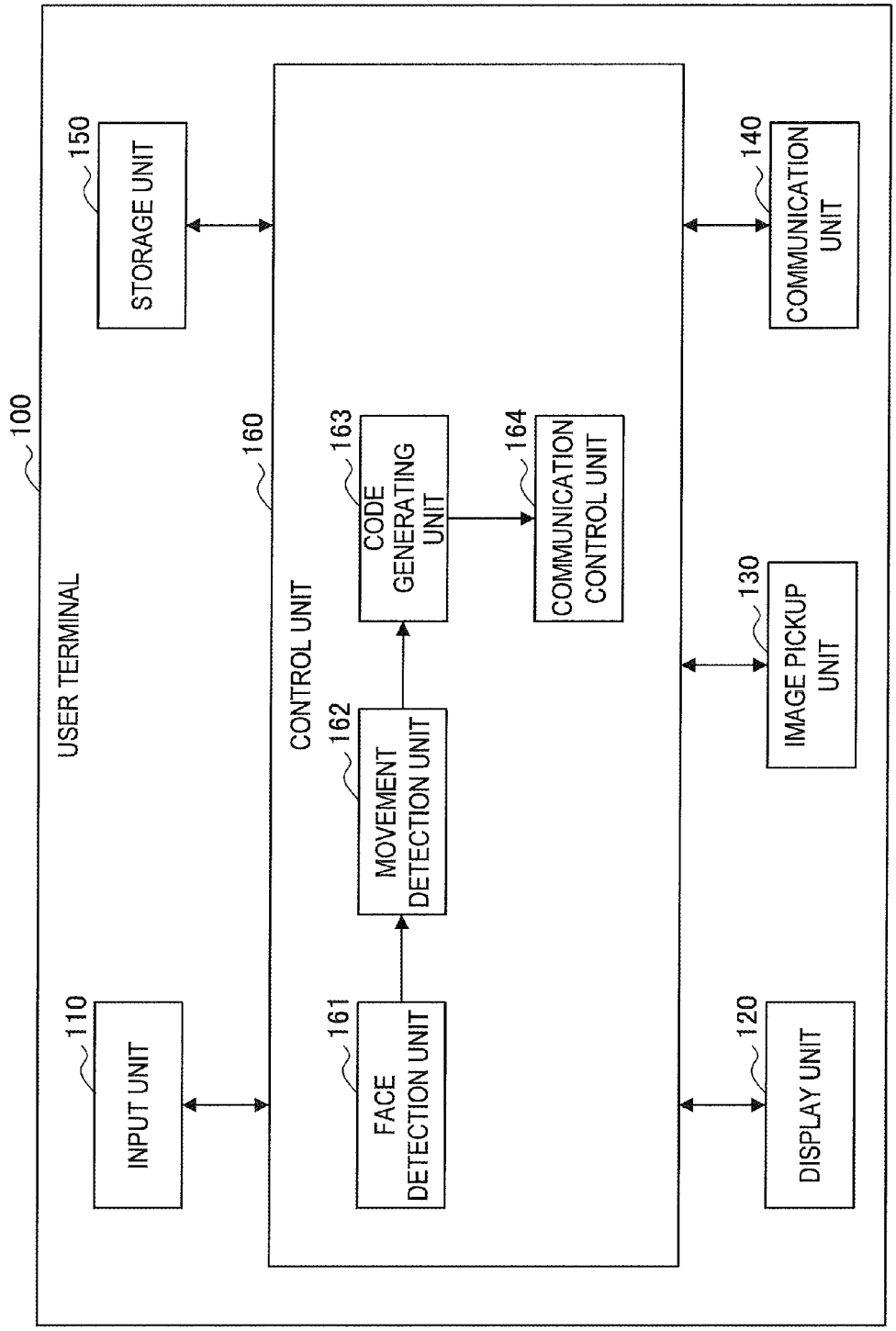
FIG. 3 is a diagram showing the detailed configuration of a user terminal.

The detailed configuration of the user terminals 100A, 100B, and 100C (hereinafter collectively referred to as the "user terminal 100") in FIG. 1 will now be described. FIG. 3 is a diagram showing the detailed configuration of the user terminal 100.

As shown in FIG. 3, the user terminal 100 includes an input unit 110, a display unit 120, the image pickup unit 130, a communication unit 140, a storage unit 150, and a control unit 160.

The input unit 110 has a function for receiving inputs of operation information from the user of the user terminal 100. For example, the input unit 110 receives an input when the user makes an operation to have image pickup carried out by the image pickup unit 130. The input unit 110 is constructed of an input apparatus such as a switch, a button, a touch panel, a keyboard, and/or a mouse.

The display unit 120 has a function for displaying various information based on control by the control unit 160. For example, the display unit 120 displays images picked up by the image pickup unit 130. The display unit 120 is constructed of a display apparatus such as a liquid crystal display, a plasma display, or an organic EL display.

The image pickup unit 130 has a function for photographing a subject. For example, the image pickup unit 130 picks up images of (i.e., photographs) the user of the user terminal 100. That is, the user of the user terminal 100 can take self shots. The image data picked up by the image pickup unit 130 is subjected to image processing and the like and is successively inputted into the control unit 160. As one example, the image pickup unit 130 outputs image data (frames) picked up at fixed intervals to the control unit 160. The image pickup unit 130 is constructed of an image pickup apparatus such as a camera with a lens and an image pickup element.

The communication unit 140 is a communication interface with a function as a transmission unit and a reception unit that communicate with the TV apparatus 200 based on control by the control unit 160. The communication unit 140 is constructed of a communication apparatus such as a wired or wireless LAN, a Bluetooth communication card, a communication router, or a communication modem.

The storage unit 150 has a function for storing various information used by the control unit 160. For example, the storage unit 150 stores the image data picked up by the image pickup unit 130. The storage unit 150 is constructed of a storage apparatus such as a magnetic storage device, a semiconductor storage device, or an optical storage device.

The control unit 160 has a function for controlling the overall operation of the user terminal 100, and as one example is capable of controlling the operation of the user terminal 100 based on operation information outputted from the input unit 110, information received by the communication unit 140, and the like. The control unit 160 is constructed of a CPU, a ROM, and a RAM.

As shown in FIG. 3, the control unit 160 includes a face detection unit 161, a movement detection unit 162, a code generating unit 163, and a communication control unit 164.

The face detection unit 161 has a function for analyzing the image data successively inputted from the image pickup unit 130 and detecting the face of a user out of the analyzed image data. The face detection unit 161 detects the face of the user from the image data inputted from the image pickup unit 130. The face detection unit 161 outputs information relating to the detected face to the movement detection unit 162. When the user of the user terminal 100 is taking self shots, for example, the face detection unit 161 detects the face of the user and outputs information relating to the detected face to the movement detection unit 162.

The movement detection unit 162 has a function for detecting, based on the information relating to the face inputted from the face detection unit 161, a change in the movement of the face of the user photographed by the image pickup unit 130. For example, the movement detection unit 162 detects movement of the user's eyes (for example, blinking of the user's eyes) as a change in the movement of the user. Here, since the user blinks unconsciously, even if the user does not intentionally move his/her face, the movement detection unit 162 will still be capable of easily detecting a change in the movement of the user by detecting the user blinking. The movement detection unit 162 outputs information relating to the detected eye movements (including information relating to the timing of blinks) to the code generating unit 163. Note that although the user's eye movements are detected in the above description, the present disclosure is not limited to this. As one example, it is also possible to detect movement of the lips as a change in the movement of the user's face.

The code generating unit 163 has a function for generating, based on the information relating to movement of the face (movement of the eyes) inputted from the movement detection unit 162, timing data (the second timing data) relating to change timing at which changes in the movement of the user's eyes were detected by the movement detection unit 162. The code generating unit 163 outputs the generated second timing data to the communication control unit 164.

The generated timing data will now be described with reference to FIG. 4. FIG. 4 shows an example of code as the timing data generated by the code generating unit 163. Here, to facilitate processing by the communication unit 140, the code shown in FIG. 4 is expressed in XML (eXtensible Markup Language). Also, the time when the movement detection unit 162 detected blinking of the user's eyes is written as an attribute of a timestamp tag in FIG. 4. The absolute time of an internal clock of the user terminal 100 is written as the detected time.

Description of the configuration of the control unit 160 will now continue with reference to FIG. 3. The communication control unit 164 controls communication with the TV apparatus 200 by the communication unit 140. For example, the communication control unit 164 controls the communication unit 140 to transmit the second timing data generated by the code generating unit 163 to the TV apparatus 200. The communication unit 140 transmits the second timing data to the TV apparatus 200 as a specified amount of packet data. When doing so, the communication control unit 164 has the second timing data corresponding to a specified amount of packet data transmitted so as to suppress any sudden increase in processing by the TV apparatus 200. Note that by measuring the communication delay for communication with the TV apparatus 200, the communication control unit 164 can synchronize the internal clocks of the user terminal 100 and the TV apparatus 200. The algorithm to do so can be realized by incorporating a known NTP (Network Time Protocol) or the like.

1-3. Detailed Configuration of TV Apparatus

The detailed configuration of the TV apparatus 200 will now be described with reference to FIG. 5. FIG. 5 is a diagram showing the detailed configuration of the TV apparatus 200 according to the first embodiment.

As shown in FIG. 5, the TV apparatus 200 includes an input unit 210, a display unit 220, the image pickup unit 230, a communication unit 240, a storage unit 250, and a control unit 260.

The input unit 210 has a function for receiving inputs of operation information from the user of the TV apparatus 200. For example, the input unit 210 receives an input when the user makes an operation to have image pickup carried out by the image pickup unit 230. The input unit 210 is constructed of an input apparatus such as a switch, a button, a touch panel, a keyboard, and/or a mouse.

The display unit 220 has a function for displaying various information based on control by the control unit 260. For example, the display unit 220 displays images picked up by the image pickup unit 230. The display unit 220 is constructed of a display apparatus such as a liquid crystal display, a plasma display, or an organic EL display.

The image pickup unit 230 has a function for photographing subjects. For example, the image pickup unit 230 picks up images of (i.e., photographs) the users who are using the user terminals 100 (in FIG. 1, user A of the user terminal 100A, user B of the user terminal 100B, and user C of the user terminal 100C). The image data picked up by the image pickup unit 230 is subjected to image processing and the like and is successively inputted into the control unit 260. As one example, the image pickup unit 230 outputs image data (frames) picked up at fixed intervals to the control unit 260. The image pickup unit 230 is constructed of an image pickup apparatus such as a camera with a lens and an image pickup element.

The communication unit 240 is a communication interface with a function as a transmission unit and a reception unit that communicate with the user terminals 100 based on control by the control unit 260. The communication unit 240 receives the second timing data generated by a user terminal 100 from the user terminal 100 during image pickup by the image pickup unit 230. The communication unit 240 is constructed of a communication apparatus such as a wired or wireless LAN, a Bluetooth communication card, a communication router, or a communication modem.

The storage unit 250 has a function for storing various information used by the control unit 260. For example, the storage unit 250 stores the image data picked up by the image pickup unit 230. The storage unit 250 is constructed of a storage apparatus such as a magnetic storage device, a semiconductor storage device, or an optical storage device.

The control unit 260 has a function for controlling the overall operation of the TV apparatus 200, and as one example is capable of controlling the operation of the TV apparatus 200 based on operation information outputted from the input unit 210, information received by the communication unit 240, and the like. The control unit 260 is constructed of a CPU, a ROM, and a RAM.

As shown in FIG. 5, the control unit 260 includes a face detection unit 261, a movement detection unit 262, a code generating unit 263, a communication control unit 264, and a determining unit 265.

The face detection unit 261 has a function for analyzing the image data successively inputted from the image pickup unit 230 and detecting the faces of users (user A, user B, user C) out of the analyzed image data. The face detection unit 261 detects the face of the user in the image data inputted from the image pickup unit 230. The face detection unit 261 outputs information relating to the detected face to the movement detection unit 262.

The movement detection unit 262 has a function for detecting, based on the information relating to the face inputted from the face detection unit 261, a change in the movement of the face of a user (user A, user B, user C) photographed by the image pickup unit 230. For example, the movement detection unit 262 detects movement of the user's eyes (for example, blinking of the user's eyes) as a change in the movement of the user. Here, since the user blinks unconsciously, even if the user does not intentionally move his/her face, the movement detection unit 262 will still be capable of easily detecting movement of the user by detecting the user blinking. The movement detection unit 262 outputs information relating to the detected eye movements (including information relating to the timing of blinks) to the code generating unit 263. Note that although the user's eye movements are detected in the above description, the present disclosure is not limited to this. As one example, it is also possible to detect movement of the user's lips as the change in the movement of the user's face.

The code generating unit 263 has a function for generating, based on the information relating to movement of the face (movement of the eyes) inputted from the movement detection unit 262, timing data (the first timing data) relating to change timing at which changes in the movement of the user's eyes were detected by the movement detection unit 262. The code generating unit 263 outputs the generated first timing data to the determining unit 265.

The communication control unit 264 controls communication with the user terminals 100 by the communication unit 240. For example, the communication control unit 264 controls the communication unit 240 to receive the second timing data generated by a user terminal 100 during image pickup by the image pickup unit 230. The communication control unit 264 outputs the second timing data received by the communication unit 240 to the determining unit 265.

The determining unit 265 determines whether the subject photographed by the image pickup unit 230 and the subject photographed by the user terminal 100 are the same or a similar subject. More specifically, the determining unit 265 determines whether the two subjects are the same or are similar based on the first timing data generated by the code generating unit 263 and the second timing data received by the communication unit 240. In this case, since such determination is made based on the two timing data, it is possible to reduce the processing load compared to when the images themselves are compared, and as a result, it is possible to extract the same or a similar user in real time.

Also, when the difference between a change timing in the first timing data and a change timing in the second timing data is smaller than a specified value, the determining unit 265 may determine that the subject being photographed by the image pickup unit 230 and the subject being photographed by the user terminal 100 is the same or a similar subject. By doing so, even if the two detected timing data slightly differ due to the user terminal 100 and the TV apparatus 200 having different viewpoints for the user, it will still be possible to detect the same or a similar user with high probability.

However, the first timing data and the second timing data respectively can include a plurality of change timings detected at different times within a certain period (see FIG. 6A, described later). In such case, the determining unit 265 compares the corresponding change timings included in the first timing data and the second timing data (for example, by comparing the errors between the timings). Here, if the proportion of the number of incidences where the difference between change timings being compared is below a specified value is larger than a specified proportion, the determining unit 265 may determine that the subjects are the same or are similar. By doing so, it is possible to detect, with higher probability, the same or a similar user photographed by the user terminal 100 and the TV apparatus 200 that have different viewpoints.

Here, a specific determining process carried out by the determining unit 265 will be described with reference to FIGS. 6A and 6B. Note that FIG. 6A is a diagram showing timetable sequences generated by the TV apparatus 200 and the user terminal 100. FIG. 6B is a diagram showing an example algorithm of the determining process carried out by the determining unit 265.

Figures 6A, 6B:
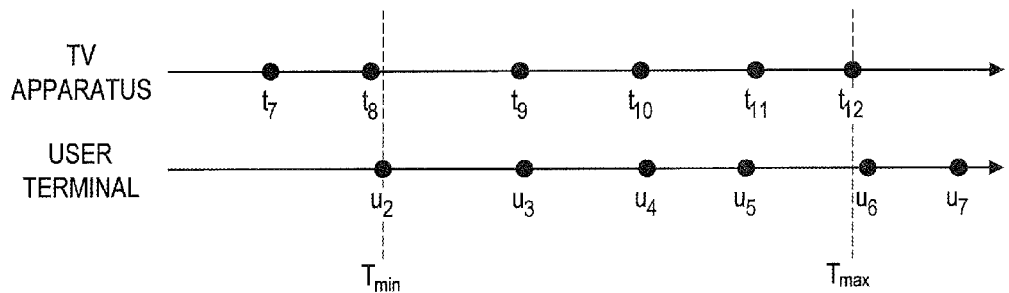
FIG. 6A is a diagram showing example timetable sequences generated by the TV apparatus and a user terminal.
FIG. 6B is a diagram showing an example algorithm of a determining process carried out by a determining unit.

In FIG. 6A, $t_i$ shows a timetable sequence (first timing data) generated by the TV apparatus 200 and $u_i$ shows a timetable sequence (second timing data) generated by the user terminal 100. Here, $t_i$ and $u_i$ show the timing of moments when the user's eyes blink. Here, for ease of explanation, it is assumed that the timetable sequence $u_i$ has been generated by one user terminal out of the user terminals 100A, 100B, and 100C in FIG. 1.

In the algorithm in FIG. 6B, the determining unit 265 first calculates $T_{min}$ and $T_{max}$. $T_{min}$ and $T_{max}$ are the minimum value and the maximum value of a range (hereinafter referred to as the "time range") that covers values of $t_i$ and $u_i$. In FIG. 6A, $T_{min}$ is $u_2$ and $T_{max}$ is $t_{12}$.

Next, the determining unit 265 calculates $i_{min}$ and $i_{max}$. Here, $i_{min}$ and $i_{max}$ are the minimum value and the maximum value of the index of $t_i$ included in the time range. In FIG. 6, $i_{min}$ is $t_9$ and $i_{max}$ is $t_{12}$.

Next, the determining unit 265 finds the closest u to each t, in the time range. In FIG. 6A, $u_3$ is closest to $t_9$, $u_4$ is closest to $t_{10}$, $u_5$ is closest to $t_{11}$, and $u_6$ is closest to $t_{12}$.

Next, the determining unit 265 finds the error err between the two time stamps of the pairs of $t_i$ and u found as described above. That is, the determining unit 265 calculates the error between $t_9$ and $u_3$, the error between $t_{10}$ and $u_4$, the error between $t_{11}$ and $u_5$, and the error between $t_{12}$ and $u_6$. The determining unit 265 then counts the number of times the calculated err is equal to or below an upper limit value $ERR_{max}$.

The determining unit 265 then calculates a proportion (here named "score") showing the number of times a corresponding u was found relative to every $t_i$ in the time range. If the calculated score is equal to or higher than a standard value (for example, 90%), the determining unit 265 determines that the faces of the users separately recognized by the TV apparatus 200 and the user terminal 100 are the same or are similar.

Note that although an example where it is determined whether the faces are the same or are similar by calculating the error err between the two time stamps $t_i$ and u has been described above as the determination algorithm, the present disclosure is not limited to this. For example, an algorithm that determines whether the faces are the same or are similar by comparing the difference in the change timing at $t_i$ and the difference in the change timing at $u_i$ may be used.

Also, although a configuration where the determining unit 265 is provided in the TV apparatus 200 has been described in the first embodiment, the present disclosure is not limited to this. For example, the determining unit may be provided in one or more user terminals 100 instead of in the TV apparatus 200 or may be provided in both the TV apparatus 200 and one or more of the user terminals 100.

Also, in the first embodiment, the image pickup unit 230 corresponds to a "first image pickup unit" for the present disclosure and the image pickup unit 130 corresponds to a "second image pickup unit". Also, the movement detection unit 262 corresponds to a "first movement detection unit" for the present disclosure, the movement detection unit 162 corresponds to a "second movement detection unit", the code generating unit 263 corresponds to a "first data generating unit", and the code generating unit 163 corresponds to a "second data generating unit".

1-4. Operation of Information Processing System

An example operation of the information processing system 10 will now be described with reference to FIG. 7. FIG. 7 is a flowchart showing an example operation of the information processing system 10. The flowchart in FIG. 7 starts with the TV apparatus 200 photographing the user of a user terminal 100 who is taking self shots as shown in FIG. 1.

This processing is realized by the CPU (computer) of the control unit 160 of the user terminal 100 and the CPU (computer) of the control unit 260 of the TV apparatus 200 executing programs stored in the respective ROMs. Note that the programs to be executed may be stored on a storage medium such as a CD (Compact Disc), a DVD (Digital Versatile Disc), or a memory card, and/or may be downloaded via the Internet from a server.

First, the user terminal 100 inputs the images picked up by the image pickup unit 130. In the same way, the TV apparatus 200 inputs the images picked up by the image pickup unit 230 (step S102). Next, the face detection unit 161 of the user terminal 100 detects a face in the images inputted from the image pickup unit 130. In the same way, the face detection unit 261 of the TV apparatus 200 also detects a face in the images inputted from the image pickup unit 230 (step S104).

Since the process that generates the code shown in FIG. 4 for the detected face is the same at the user terminal 100 and the TV apparatus 200, an example of processing at the TV apparatus 200 will be described below.

Next, the movement detection unit 262 of the TV apparatus 200 calculates the distance dist from the face (id=a) at the closest distance out of a group of faces (id=0, . . . , n) detected in the immediately preceding frame (step S106). The movement detection unit 262 then determines whether the calculated distance dist is equal to or above a threshold (step S108).

If the distance dist is equal to or above a threshold in step S108 (Yes), the movement detection unit 262 assigns a new id (=b) as a face to be newly registered (step S110). The code generating unit 263 next generates code (timing data) for the face with the new id=(b) (step S114).

If the distance dist is below the threshold in step S108 (No), the movement detection unit 262 fetches the code (timing data) for a face (id=a) that has already been assigned an id (step S112).

After step S112 or step S114, the movement detection unit 262 determines whether blinking of the user's eyes has been detected (step S116). If the blinking of the user's eyes is detected in step S116 (Yes), the code generating unit 263 adds a timestamp of the moment of the blink to the generated code or the fetched code (step S118).

By doing so, the TV apparatus 200 generates the timing data shown in FIG. 4. In the same way, the user terminal 100 also generates the timing data shown in FIG. 4 by carrying out the processing S106 to S118 described above. Note that if a plurality of faces have been detected in step S104, the processing in steps S106 to S118 described above is carried out for each of the detected faces.

If a certain period has passed from the inputting of an image in step S102, the user terminal 100 and the TV apparatus 200 transmit the code for each face to another apparatus (step S122). Next, the user terminal 100 and the TV apparatus 200 determine whether code has been received from another apparatus (step S124).

The following describes the case where the TV apparatus 200 has received code from the user terminal 100. When the TV apparatus 200 has received code (id=x) from the user terminal 100 in step S124 (Yes), the determining unit 265 of the TV apparatus 200 carries out the determining process in FIG. 6B described earlier for the codes (id=0, n) of the stored group of faces and the received code (id=x) of a face (step S126). Here, the determining unit 265 carries out determination by comparing the received face code (id=x) with the code of a face (here assumed to be id=m) which corresponds to the received face code out of the code of the group of faces.

In the determining process, the determining unit 265 determines whether the proportion "score" in FIG. 6B for the code of the face (id=x) and the code of the face (id=m) is larger than a specified standard value (step S128). If the score is larger than a specified standard value in step S128 (Yes), the determining unit 265 determines that the faces relating to the two codes are the same (or a similar) face (step S130).

Note that when the TV apparatus 200 has received code from a plurality of user terminals 100 in step S126, the determining unit 265 carries out the processing in steps S126 to S130 described above for each of the received face codes.

According to the first embodiment, the TV apparatus 200 receives the second timing data generated by the user terminal 100 from the user terminal 100 during image pickup by the image pickup unit 230. The TV apparatus 200 then determines, based on the first timing data and the second timing data, whether the user photographed by the image pickup unit 230 and the user photographed by the image pickup unit 130 are the same or a similar user.

In this case, when a user has been photographed by the TV apparatus 200 and the user terminal 100 that have different viewpoints, even if the user is facing in different orientations to the respective apparatuses, it will still be possible to determine whether the same user is being photographed based on the timing of movements of the user's face. This means that it is possible when the user has been photographed by the TV apparatus 200 and the user terminal 100 that have different viewpoints, it is possible to easily extract the same or a similar user. In particular, since it is not necessary to store specified face images in advance, it is possible to extract the same or a similar user in real time. Note that although the user of the user terminal 100 is extracted in the above description, it is also possible to detect a person aside from the user who is being photographed by the TV apparatus 200 and the user terminal 100.

2. Second Embodiment

Figure 8:
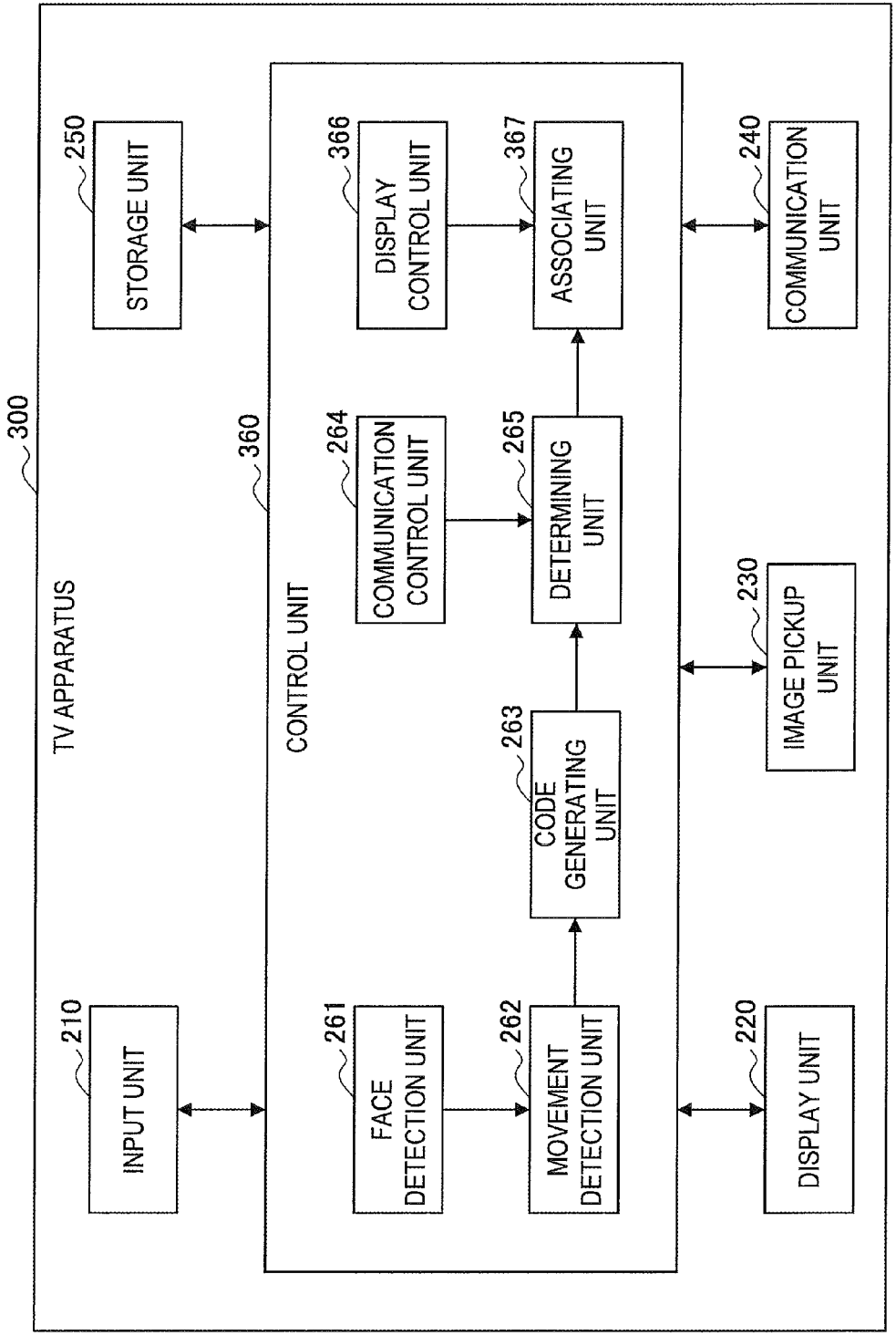
FIG. 8 is a diagram showing the detailed configuration of a TV apparatus according to a second embodiment.

A TV apparatus 300 according to a second embodiment of the present disclosure will now be described with reference to FIG. 8. FIG. 8 is a diagram showing the detailed configuration of the TV apparatus 300 according to the second embodiment. The configuration of the TV apparatus 300 is the same as that of the TV apparatus 200 in FIG. 5 described earlier, but a control unit 360 of the TV apparatus 300 has a different configuration to the control unit 260 of the TV apparatus 200. For this reason, the following description will focus on the configuration of the control unit 360. Note that the functions and the like of component elements that are not described here are the same as in the configuration shown in FIG. 5.

As shown in FIG. 1, The TV apparatus 300 according to the second embodiment is capable of photographing the users A, B, and C of the three user terminals 100A, 100B, and 100C. Also, the users A, B, and C are capable of operating the TV apparatus 300 with the respective user terminals 100A, 100B, and 100C as input devices.

As shown in FIG. 8, the control unit 360 includes a display control unit 366 and an associating unit 367, in addition to the face detection unit 261, the movement detection unit 262, the code generating unit 263, the communication control unit 264, and the determining unit 265 described earlier.

The display control unit 366 controls the display of the display unit 220. For example, the display control unit 366 has images corresponding to the users photographed by the image pickup unit 230 (the user A of the user terminal 100A, the user B of the user terminal 100B, and the user C of the user terminal 100C) displayed on the display unit 220 as shown in FIG. 9.

Figure 9:
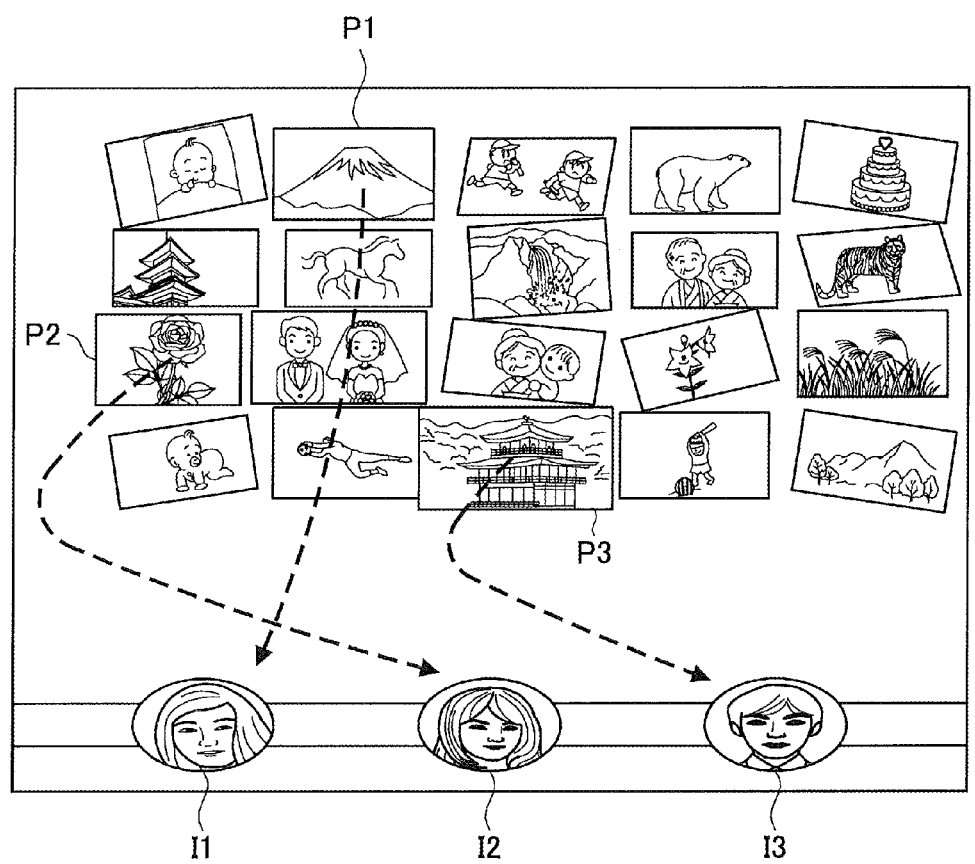
FIG. 9 is a diagram showing an example display of a display unit.

FIG. 9 is a diagram showing an example display of the display unit 220. In FIG. 9, a face image I1 showing the face of the user A, a face image I2 showing the face of the user B, and a face image I3 showing the face of the user C are displayed in the lower part of the display screen as images corresponding to the users photographed by the image pickup unit 230. Note that images (photographs or the like) are also displayed in the upper part of the display screen.

If the determining unit 265 determines that a user photographed by the image pickup unit 230 and a user photographed by a user terminal 100 are the same or a similar user, the associating unit 367 associates the corresponding face image displayed on the display unit 220 with such user terminal 100. In FIG. 9, the associating unit 367 associates the face image I1 with the user terminal 100A, the face image I2 with the user terminal 100B, and the face image I3 with the user terminal 100C. By doing so, since correspondence is automatically established between the TV apparatus 300 (i.e., face images displayed on the display unit 220) and the respective user terminals 100A, 100B, and 100C, the user does not need to carry out an operation to associate the TV apparatus 300 (more specifically, the face images) and the user terminals.

Here, it is possible for a user (i.e., a user of the TV apparatus 300 or a user of a user terminal 100) to make operations on the display screen shown in FIG. 9, and as one example an operation may be performed for the face images I1, I2, and I3. For this reason, the input unit 210 of the TV apparatus 300 receives an operation for the image associated with a user terminal 100 by the associating unit 367.

For example, if a user carries out an operation that drags and drops the photograph P1 onto the face image I1 on the display screen shown in FIG. 9, the communication unit 240 transmits the photograph P1 to the user terminal 100A associated with the face image I1. In the same way, the communication unit 240 transmits the photograph P2 to the user terminal 100B associated with the face image I2 and transmits the photograph P3 to the user terminal 100C associated with the face image I3. In this way, when the input unit 210 has received an operation for a face image, the communication control unit 264 controls the communication unit 240 to carry out communication with the user terminal 100 associated with such face image and carries out processing corresponding to the user operation.

According to the second embodiment, since correspondence is automatically established between the face images displayed on the TV apparatus 300 and the user terminals 100A, 100B, and 100C, the user does not need to carry out an operation that associates the face images displayed on the TV apparatus 300 with the user terminals. It also becomes possible to carry out communication such as data transmission according to an intuitive operation by the user on the screen.

3. Third Embodiment

Figure 10:
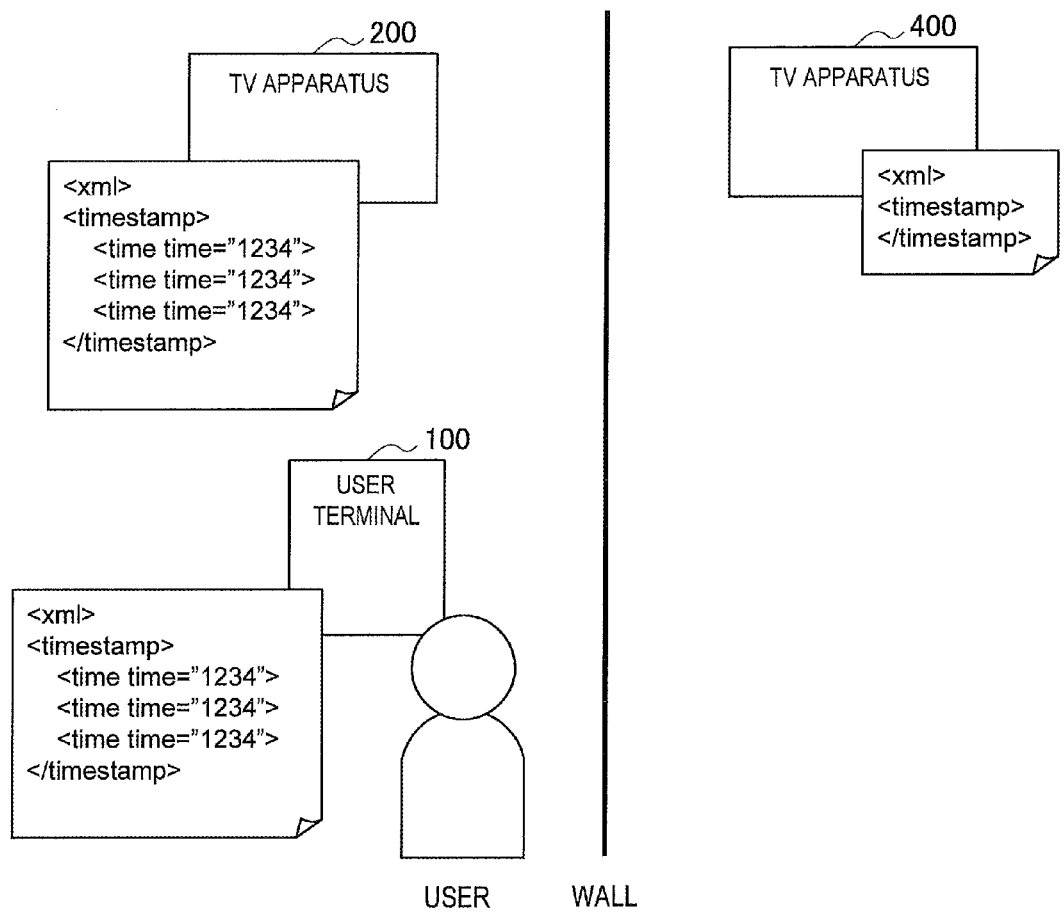
FIG. 10 is a diagram showing an information processing system according to a third embodiment.

An information processing system 11 according to a third embodiment of the present disclosure will now be described with reference to FIG. 10. FIG. 10 is a diagram showing the information processing system 11 according to the third embodiment.

The information processing system 11 shown in FIG. 10 includes the user terminal 100, the TV apparatus 200, and a TV apparatus 400 present on the same network. The TV apparatus 200 and the user terminal 100 are located in the same room and the TV apparatus 400 is located in another room separated by a wall. For this reason, the TV apparatus 200 is capable of photographing the user of the user terminal 100 but the TV apparatus 400 is not capable of photographing the user of the user terminal 100.

In this third embodiment also, the user terminal 100, the TV apparatus 200, and the TV apparatus 400 generate the code (timing data) described with reference to FIG. 4. Here, the generated code is transmitted as a PIN code during pairing to establish a communication connection. Communication is then established between apparatuses for which the transmitted and received codes match. By doing so, pairing can be carried out securely for the user terminal 100 and the TV apparatus 200 that are located in the same room.

FIG. 11 is a sequence chart useful in explaining the operation of the information processing system 11 when carrying out the pairing process.

First, the user terminal 100 broadcasts a packet, which is used to search for devices, to the devices present on the same network (here, the TV apparatus 200 and the TV apparatus 400) (steps S202, S204). On receiving the search packet, the TV apparatus 200 and the TV apparatus 400 transmit a response packet to the user terminal 100 (steps S206, S208).

Next, the user terminal 100, the TV apparatus 200, and the TV apparatus 400 each carry out a process that generates the code (timing data) shown in FIG. 4 described earlier (steps S210, S212, S214). Here, since the user terminal 100 and the TV apparatus 200 photograph the user of the user terminal 100, code corresponding to movements of the user's face (i.e., blinking of the eyes) is generated. Meanwhile, since the TV apparatus 400 is not able to photograph the user of the user terminal 100, code that does not correspond to movement of the face of the user of the user terminal 100 is generated (or alternatively no code may be generated). Note that although the generation of code is carried out after the transmission of a response packet in the above description, the present disclosure is not limited to this and the generation of code may be carried out before the transmission of the response packet, for example.

Next, the user terminal 100 transmits the code generated in step S212 to the TV apparatus 200 and the TV apparatus 400 as a PIN code (steps S216, S218). That is, the code shown in FIG. 4 also functions as a PIN code during pairing to establish a communication connection, which means that it is unnecessary to generate a dedicated PIN code.

The determining unit 265 of the TV apparatus 200 compares the code received by the communication unit 240 from the user terminal 100 and the code generated in step S210 (step S220). Here, since the TV apparatus 200 and the user terminal 100 are photographing the same user, the determining unit 265 determines that the two codes are the same. The communication control unit 264 of the TV apparatus 200 then accepts the connection request and transmits a packet to the user terminal 100 (step S222).

In the same way, the TV apparatus 400 compares the code received from the user terminal 100 and the code generated in step S214 (step S224). Here, since the TV apparatus 400 is incapable of photographing the user of the user terminal 100, it is determined that the two codes are not the same. The TV apparatus 400 then transmits a rejection packet for the connection request to the user terminal 100 (step S226).

After this, out of the user terminal 100 and the TV apparatuses 200, 400 on the same network, the user terminal 100 and the TV apparatus 400 that are located in the same room establish a connection with each other and thereafter communicate (step S228). By doing so, the pairing process according to the third embodiment is completed.

According to the third embodiment, since it is possible to identify devices (the user terminal 100 and the TV apparatus 200) located in the same room using code generated by photographing the user, it is possible to securely carry out pairing of the user terminal 100 and the TV apparatus 200 using a simple method.

It should be understood by those skilled in the art that various modifications, combinations, sub-combinations and alterations may occur depending on design requirements and other factors insofar as they are within the scope of the appended claims or the equivalents thereof.

Although the movement detection units detect movement of body parts (such as eyes or lips) of the user in the embodiments described above, the present disclosure is not limited to this. As examples, it is also possible to detect movement of the user's hands or feet. Also, although examples where the subject is a user have been described in the above embodiments, the present disclosure is not limited to this and the subject may be any subject that moves, such as an animal.

It should be obvious that the steps included in the flowcharts in the embodiments described above may be processes that are carried out in a time series in the given order. However, such processes do not need to be carried out in a time series and the present disclosure also includes a case where the processes are carried out individually or in parallel. For steps that are performed in a time series, it should also be obvious that the order of such steps may be changed as appropriate depending on the circumstances.

Additionally, the present technology may also be configured as below.

(1)
An information processing apparatus including:
an image pickup unit photographing a subject;
a movement detecting unit detecting changes in movement of the subject photographed by the image pickup unit;
a data generating unit generating first timing data relating to change timing at which the movement detecting unit detected the changes in the movement;
a receiving unit receiving second timing data, which relates to change timing when movement of a subject photographed by another apparatus was detected, from the other apparatus during photographing by the image pickup unit; and
a determining unit determining, based on the first timing data generated by the data generating unit and the second timing data received by the receiving unit, whether the subject photographed by the image pickup unit and the subject photographed by the other apparatus are the same or a similar subject.

(2)
An information processing apparatus according to (1),
wherein the determining unit is operable when a difference between the change timing in the first timing data and the change timing in the second timing data is smaller than a specified value, to determine that the subject photographed by the image pickup unit and the subject photographed by the other apparatus are the same or a similar subject.

(3)
An information processing apparatus according to (2),
wherein the first timing data and the second timing data respectively include a plurality of change timings detected at different timings within a certain period, and
the determining unit compares corresponding change timings included in the first timing data and the second timing data with one another, and determines that the photographed subjects are the same or a similar subject if a proportion of incidences where a difference between the compared change timings is smaller than the specified value is larger than a specified proportion.

(4)

An information processing apparatus according to any one of (1) to (3), wherein the movement detection unit detects blinking of human eyes as the change in movement of the subject.

(5)

An information processing apparatus according to any one of (1) to (4), further comprising:

a display control unit having a display unit display an image corresponding to the subject photographed by the image pickup unit; and an associating unit operable when the determining unit has determined that the subject photographed by the image pickup unit and the subject photographed by the other apparatus are the same or a similar subject, to associate the image displayed on the display unit with the other apparatus.

(6)

An information processing apparatus according to (5), further including:

an input unit receiving an operation for the image that has been associated with the other apparatus by the associating unit; and a communication control unit operable when an operation has been received by the input unit, to communicate with the other apparatus.

(7)

An information processing apparatus according to any one of (1) to (6), wherein the receiving unit receives the second timing data as a PIN code during pairing for establishing a communication connection with the other apparatus.

(8)

An information processing apparatus according to (7), further including a communication control unit operable when the determining unit has determined that the subject photographed by the image pickup unit and the subject photographed by the other apparatus are the same or a similar subject, to establish a communication connection with the other apparatus.

(9)

An information processing method including:

detecting a change in movement of a subject photographed by an image pickup unit of an apparatus;

generating first timing data relating to change timing at which the change in movement was detected;

receiving second timing data, which relates to change timing when movement of a subject photographed by another apparatus was detected, from the other apparatus during photographing by the image pickup unit; and determining, based on the generated first timing data and the received second timing data, whether the subject photographed by the image pickup unit and the subject photographed by the other apparatus are the same or a similar subject.

(10)

A program causing a computer to detect a change in movement of a subject photographed by an image pickup unit of an apparatus, to generate first timing data relating to change timing at which the change in movement was detected, to receive second timing data, which relates to change timing when movement of a subject photographed by another apparatus was detected, from the other apparatus during photographing by the image pickup unit, and to determine, based on the generated first timing data and the received second timing data, whether the subject photographed by the image pickup unit and the subject photographed by the other apparatus are the same or a similar subject.

(11)

An information processing system including:

an information processing apparatus including a first image pickup unit photographing a subject, a first movement detecting unit detecting changes in movement of a subject photographed by the first image pickup unit, and a first data generating unit generating first timing data relating to change timing at which the first movement detecting unit detected a change in the movement; and a communication apparatus including a second image pickup unit photographing a subject, a second movement detecting unit detecting changes in movement of a subject photographed by the second image pickup unit, a second data generating unit generating second timing data relating to change timing at which the second movement detecting unit detected a change in the movement, and a transmission unit transmitting the second timing data generated by the second data generating unit to the information processing apparatus, wherein the information processing apparatus further includes a receiving unit receiving the second timing data via the transmission unit from the communication apparatus during photographing by the first image pickup unit, and a determining unit determining, based on the first timing data and the second timing data, whether the subject photographed by the first image pickup unit and the subject photographed by the second image pickup unit are the same or a similar subject.

The present disclosure contains subject matter related to that disclosed in Japanese Priority Patent Application JP 2011-117610 filed in the Japan Patent Office on May 26, 2011, the entire content of which is hereby incorporated by reference.

What is claimed is:

1. An information processing apparatus comprising:
an image pickup unit photographing a subject;
a movement detecting unit detecting changes in movement of the subject photographed by the image pickup unit;
a data generating unit generating first timing data relating to change timing at which the movement detecting unit detected the changes in the movement;
a receiving unit receiving second timing data, which relates to change timing when movement of a subject photographed by another apparatus was detected, from the other apparatus during photographing by the image pickup unit; and
a determining unit determining, based on the first timing data generated by the data generating unit and the second timing data received by the receiving unit, whether the subject photographed by the image pickup unit and the subject photographed by the other apparatus are the same or a similar subject,
wherein the determining unit is operable when a difference between the change timing in the first timing data and the change timing in the second timing data is smaller than a specified value, to determine that the subject photographed by the image pickup unit and the subject photographed by the other apparatus are the same or a similar subject,
wherein the first timing data and the second timing data respectively include a plurality of change timings detected at different timings within a certain period, and
the determining unit compares corresponding change timings included in the first timing data and the second timing data with one another, and determines that the photographed subjects are the same or a similar subject if a proportion of incidences where a difference between the compared change timings is smaller than the specified value is larger than a specified proportion.

2. An information processing apparatus according to claim 1, wherein the movement detection unit detects blinking of human eyes as the change in movement of the subject.

3. An information processing apparatus according to claim 1, further comprising:
a display control unit having a display unit display an image corresponding to the subject photographed by the image pickup unit; and
an associating unit operable when the determining unit has determined that the subject photographed by the image pickup unit and the subject photographed by the other apparatus are the same or a similar subject, to associate the image displayed on the display unit with the other apparatus.

4. An information processing apparatus according to claim 3, further comprising:
an input unit receiving an operation for the image that has been associated with the other apparatus by the associating unit; and
a communication control unit operable when an operation has been received by the input unit, to communicate with the other apparatus.

5. An information processing apparatus comprising:
an image pickup unit photographing a subject;
a movement detecting unit detecting changes in movement of the subject photographed by the image pickup unit;
a data generating unit generating first timing data relating to change timing at which the movement detecting unit detected the changes in the movement;
a receiving unit receiving second timing data, which relates to change timing when movement of a subject photographed by another apparatus was detected, from the other apparatus during photographing by the image pickup unit; and
a determining unit determining, based on the first timing data generated by the data generating unit and the second timing data received by the receiving unit, whether the subject photographed by the image pickup unit and the subject photographed by the other apparatus are the same or a similar subject,
wherein the receiving unit receives the second timing data as a PIN code during pairing for establishing a communication connection with the other apparatus.

6. An information processing apparatus according to claim 5,
further comprising a communication control unit operable when the determining unit has determined that the subject photographed by the image pickup unit and the subject photographed by the other apparatus are the same or a similar subject, to establish a communication connection with the other apparatus.

7. An information processing method comprising:
detecting a change in movement of a subject photographed by an image pickup unit of an apparatus;
generating first timing data relating to change timing at which the change in movement was detected;
receiving second timing data, which relates to change timing when movement of a subject photographed by another apparatus was detected, from the other apparatus during photographing by the image pickup unit; and
determining, based on the generated first timing data and the received second timing data, whether the subject photographed by the image pickup unit and the subject photographed by the other apparatus are the same or a similar subject,
wherein when a difference between the change timing in the first timing data and the change timing in the second timing data is smaller than a specified value, the subject photographed by the image pickup unit and the subject photographed by the other apparatus are determined to be the same or a similar subject,
wherein the first timing data and the second timing data respectively include a plurality of change timings detected at different timings within a certain period, and
corresponding change timings included in the first timing data and the second timing data are compared with one another, and the photographed subjects are determined to be the same or a similar subject if a proportion of incidences where a difference between the compared change timings is smaller than the specified value is larger than a specified proportion.

8. An information processing method according to claim 7, wherein a blinking of human eyes is detected as the change in movement of the subject.

9. A non-transitory computer-readable medium having embodied thereon a program, which when executed by a computer causes the computer to implement a method, the method comprising the steps of:
to detect a change in movement of a subject photographed by an image pickup unit of an apparatus,
to generate first timing data relating to change timing at which the change in movement was detected,
to receive second timing data, which relates to change timing when movement of a subject photographed by another apparatus was detected, from the other apparatus during photographing by the image pickup unit, and
to determine, based on the generated first timing data and the received second timing data, whether the subject photographed by the image pickup unit and the subject photographed by the other apparatus are the same or a similar subject,
wherein when a difference between the change timing in the first timing data and the change timing in the second timing data is smaller than a specified value, the subject photographed by the image pickup unit and the subject photographed by the other apparatus are determined to be the same or a similar subject,
wherein the first timing data and the second timing data respectively include a plurality of change timings detected at different timings within a certain period, and
corresponding change timings included in the first timing data and the second timing data are compared with one another, and the photographed subjects are determined to be the same or a similar subject if a proportion of incidences where a difference between the compared change timings is smaller than the specified value is larger than a specified proportion.

10. A non-transitory computer-readable medium according to claim 9,
wherein a blinking of human eyes is detected as the change in movement of the subject.

11. An information processing system comprising:
an information processing apparatus including a first image pickup unit photographing a subject, a first movement detecting unit detecting changes in movement of a subject photographed by the first image pickup unit, and a first data generating unit generating first timing data relating to change timing at which the first movement detecting unit detected a change in the movement; and a communication apparatus including a second image pickup unit photographing a subject, a second movement detecting unit detecting changes in movement of a subject photographed by the second image pickup unit, a second data generating unit generating second timing data relating to change timing at which the second movement detecting unit detected a change in the movement, and a transmission unit transmitting the second timing data generated by the second data generating unit to the information processing apparatus, wherein the information processing apparatus further includes a receiving unit receiving the second timing data via the transmission unit from the communication apparatus during photographing by the first image pickup unit, and a determining unit determining, based on the first timing data and the second timing data, whether the subject photographed by the first image pickup unit and the subject photographed by the second image pickup unit are the same or a similar subject, wherein the determining unit is operable when a difference between the change timing in the first timing data and the change timing in the second timing data is smaller than a specified value, to determine that the subject photographed by the first image pickup unit and the subject photographed by the second image pickup unit are the same or a similar subject, wherein the first timing data and the second timing data respectively include a plurality of change timings detected at different timings within a certain period, and the determining unit compares corresponding change timings included in the first timing data and the second timing data with one another, and determines that the photographed subjects are the same or a similar subject if a proportion of incidences where a difference between the compared change timings is smaller than the specified value is larger than a specified proportion.

12. An information processing system according to claim 11, wherein the first and second movement detection units detect blinking of human eyes as the change in movement of the subject.

* * * * *